Dec. 8, 1970 R. E. BEEBE 3,545,010
RODENT BARRIER ATTACHMENT FOR WATER CLOSETS
Filed Feb. 26, 1968 2 Sheets-Sheet 1

INVENTOR.
ROBERT E. BEEBE
BY
ATTORNEYS

Dec. 8, 1970   R. E. BEEBE   3,545,010
RODENT BARRIER ATTACHMENT FOR WATER CLOSETS
Filed Feb. 26, 1968   2 Sheets-Sheet 2
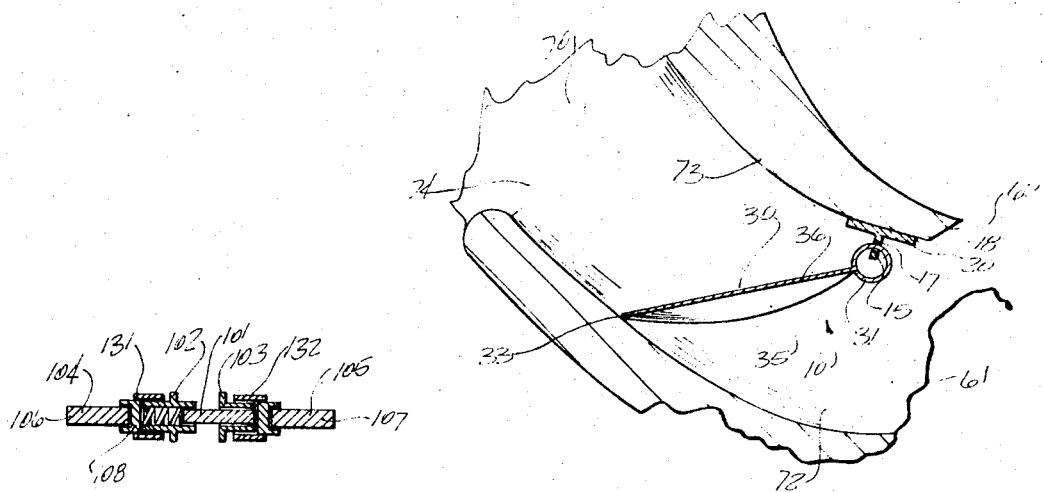
Fig. 9
Fig. 6
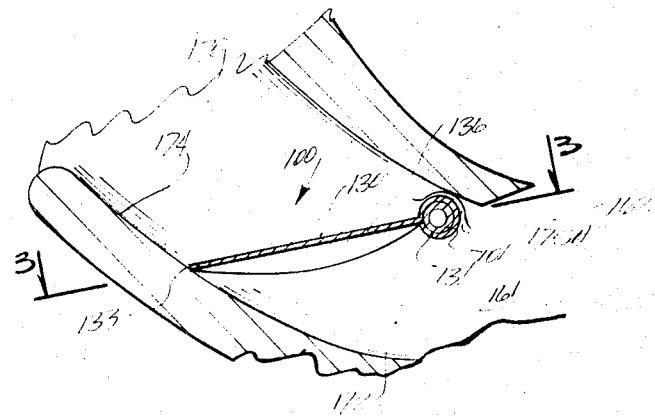
Fig. 7
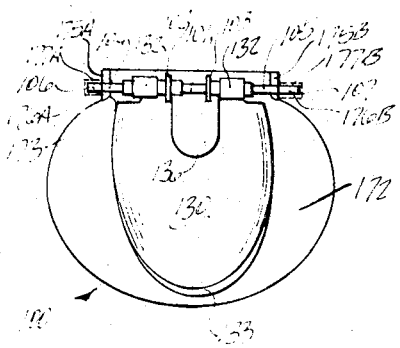
Fig. 8
INVENTOR.
ROBERT E. BEEBE
BY
ATTORNEYS

United States Patent Office 3,545,010
Patented Dec. 8, 1970

3,545,010
RODENT BARRIER ATTACHMENT FOR WATER CLOSETS
Robert E. Beebe, 2050 N. 94th St.,
Omaha, Nebr. 68134
Filed Feb. 26, 1968, Ser. No. 708,397
Int. Cl. A01k *69/06;* A01m *23/02*
U.S. Cl. 4—1                              16 Claims

ABSTRACT OF THE DISCLOSURE

This invention provides a rodent barrier attachment that may be inserted into the discharge channel of a conventional water closet, and affixed therein, so as to prevent the entrance of sewer dwelling rodents into the bowl of the water closet; this without impairing the normal function of the water closet.

---

Municipal sewer systems, to which a majority of home and business toilets, sinks and drains flush their debris, comprise a network of interconnected sewer pipes of relatively large diameter that carry this refuse to disposal areas or facilities. It is a well documented fact that sewer rats infest these sewer lines in great numbers, and derive their food supply from the waste materials disposed throughout this system. The great popularity of the kitchen sink garbage disposal has rapidly expanded the volume of very edible wastes which are washed directly into the sewer lines. Since much of this waste is comprised of solid materials or food particles, they precipitate out and are strewn along the length of the connector line that links home to main sewer. As such, they form an edible trail of food that leads to the home sewer system.

Thus, because of the realtively large size of sewer pipes, because of the presence of air and edible waste throughout the system, and because of the corrosion and collection of debris on the walls of the home standpipes leading to the water closet which provide adequate footholds for these agile creatures, sewer rats are able to nest, breed, live and travel throughout the sewer system and even into the bathrooms, through the water closet. When discovered in the home, the vicious reaction of these disease-carrying rodents can be a source of real danger and terror to the occupants of the home.

Since the discharge channel of the water closet provides one of the largest, unobstructed entryways from the sewer system into the home, it is the selective, one-way blocking of this passage to the ingress of sewer rats that is the concern of this invention. Prior art indicates the existence and use of one-way valves that have been placed at various points in the sewer line leading from home to main sewer. Some are even placed at the point where the discharge channel of the water closet connects to the drain at the floor line. Though these basically function to prevent the backing up of water, they would seem to inherently act as barriers to the ingress of sewer rats as well. However, they are currently found in very few homes. And the extremely high cost of installation would actively forestall their general use as rodent barriers. There is an even more important reason for assuming that their use as rodent barriers would and should be highly limited. Most experts in this area of art, including public officials who are responsible for dealing with sewer problems, indicate that the vast majority of one-way backup valves function properly for only a short period of time. Since they are placed in the relatively dry side of the sewer discharge line, i.e., beyond the water.filled sump of the toilet bowl, the buildup of large segments of waste material, lint, etc. about their seats and hinge areas rapidly wedges them in a relatively open position. This material tends to dry and solidify between flushings of the toilet, and to continue to build up at subsequent flushings. Though the explosive entry of outside water might flush away this material and allow the valve to function properly in this regard, no such action accompanies the ingress of sewer rats. Since it would be very costly even to check these valves occasionally for proper function, their use as rodent barriers is all but impossible. The only economical and logical answer, then, would seem to require a simple, gravity-operated barrier that lies in the first few inches of the toilet discharge channel, and predominantly beneath the water that always remains in the bowl, sump and initial portion of this discharge.

It is accordingly an object of this invention to provide a rodent barrier device that may be easily, and quickly inserted into the initial length of the discharge channel throat of a bathroom water closet, and affixed therein.

It is another object of this invention to provide a rodent barrier attachment that will not restrict in any way the ready flushing of all debris out of the toilet bowl, while at all other times preventing the ingress of sewer rats into the water closet toilet bowl.

It is another object of this invention to provide a rodent barrier attachment that will reside at a position in the discharge channel predominantly or wholly under the water, except during periodic flushing of the water closet. The ultimate purpose, of course, is to assure that waste material that may cling to the rodent barrier attachment during flushing action of the water closet be kept moist, and not allowed to dry, so that it may be washed away during subsequent flushings.

It is another purpose of the present invention to provide a rodent barrier attachment that may be easily and effectively positioned and affixed in the water closet discharge throat without tools; or with very common tools at most.

It is yet another object of the present invention to provide a rodent barrier attachment that will function effectively in water closet throats of various cross-sectional sizes and shapes.

It is yet another object of this invention to provide a rodent barrier attachment that is positioned completely within the water closet discharge channel so as to avoid the projection of parts of the rodent barrier into the bowl portion of the water closet where it may disturb the swirling-flushing action of the toilet, snag debris, and generally detract from the aesthetic appearance of the toilet bowl. The later point is particularly important where the fixtures in the bathroom are other than white.

It is another purpose of this invention to provide a rodent barrier attachment that is sufficiently close to the bowl exit into the discharge channel throat to be readily checked periodically for proper, free function.

It is another object of this invention to provide a rodent barrier attachment that is so chemically inert to the effects of water, wastes and acid and alkaline solutions in which it is predominantly immersed that it may reside permanently in position in the water closet discharge throat without serious deterioration.

It is yet another object of this invention to provide a rodent barrier attachment of the fewest possible mechanical parts, and that is simple and economical to manufacture and use, and durable in position.

It is another object of this invention to provide a rodent barrier attachment that is not only simple and economical to attach in water closets currently installed and in use, but one that is also of a desirable and useful design for inexpensive installation in new toilets, by their manufacturers.

With these and other objects in mind, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

In the drawings, wherein like numbers refer to like parts in several views:

FIG. 6 is an enlarged detail view of FIG. 2 showing the rodent barrier attachment positioned just within the entrance of the water closet discharge channel. It is shown in the "barrier" position, with the pivotably attached tongue member resting with its tip against the lower shelf of the discharge channel.

FIG. 7 is an enlarged detail view showing embodiment 100 of the rodent barrier attachment of the present invention in position just within the water closet discharge channel. It also shows a slight modification of the discharge channel throat to facilitate positioning of the rodent barrier attachment.

Figure 2:
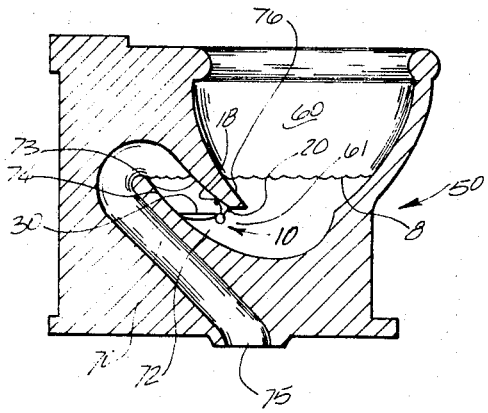
FIG. 2 is a sectional view of the water closet and rodent barrier attachment taken along line 2—2 of FIGS. 1 and 2, showing the rodent barrier attachment positioned just within the entrance of the discharge channel and generally beneath the water level in this "sump" area.
Figure 3:
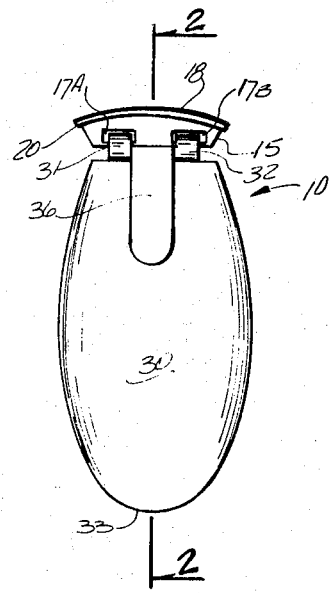
FIG. 3 is a top plan view of the rodent barrier attachment for the water closet.

FIG. 8 is a front perspective and sectional view of embodiment 100 of the rodent barrier attachment in position in the water closet discharge channel taken approximately along line 3—3 of FIG. 7, showing the forshortened tongue and the very limited modifications of the generally elliptical shape of the upper or ceiling portion of the discharge channel throat required to allow positioning and securing of embodiment 100 of the rodent barrier attachment therein.

FIG. 9 is a sectional view of the spring-loaded, compressible pinion used in embodiment 100 of the rodent barrier attachment to anchor the pivotably attached tongue in position by expanding into the cylindrical wells or receivers positioned opposite one another in the upper walls of the discharge channel throat.

The rodent barrier attachment device 10 is readily employed in conjunction with a conventional water closet 50 comprising a bowl 60 and a serpentine discharge channel 70 which is substantially of elliptical cross-sectional shape and enters bowl 60 at a predominantly vertical lower bowl opening 61. The discharge channel 70 initially slants rather steeply upwardly from the bowl opening 61 at the "throat" 72 to provide a water level-metering sump 71 within the bowl 60 and discharge channel throat 72, said sump 71 when filled with water providing a trap that prevents sewer gas from entering from channel outlet 75, and providing also a liquid both that helps dilute and retain the generally liquid form of waste material deposited in the bowl 60, thus facilitating the clean flushing of said wastes out through discharge channel 70. An upwardly curving shelf portion 76 of the water closet provides both the interior wall of bowl 60 and the roof 73 of the discharge channel throat 72. Because of the relatively elliptical cross-sectional shape of the throat 72, the upper portion is defined as the roof, the lower portion as the floor, and the two, opposite side portions as the walls.

The less-preferred embodiment 100 of the rodent barrier attachment is readily employed in conjunction with a water closet that is conventional in every aspect of design and function as described above except that a very limited modification of the shape and design of a short segment of the roof 173 (see FIGS. 7 and 8) of the discharge channel throat 172 at a point very close to the lower bowl exit 161 must be made during water closet manufacture in that the generally vertical-walled 177A and 177B, arch domed insets 175A and 175B must be created in the generally curved cross-sectional shape of upper walls and roof 173 of throat 172, each inset of the two being directly opposite to the other and running, as a combined element, from side to side parallel to the cross-sectional plane of throat 172 and horizontal to said throat, as shown in FIG. 8, forming a straight, horizontally positioned, arch domed flute or trench 175A–175B, shown as 175A in the enlarged sectional view of FIG. 7, that at the highest point of its arched-dome coincides with or only slightly penetrates the sectional sweep of throat roof 173 at its highest, cross-sectional center, point. Said arch-domed flute or trench then indents more deeply into the downwardly sweeping curved roof 173 as it extends outwardly from the center of the throat roof 173 towards the throat side walls, and terminates in vertical, flat walls 177A and 177B which are parallel to the plane of the throat. Into the center of each of the two vertically end walls 177A–177B of inset 175A–175B, and at right angles to the plane of the end-walls, will be inset cylindrical wells, being stopped or blind holes of a moderate depth into which will be inserted the tips 106 and 107 of the compressible-expandable, spring-tensioned pinion 101 to which the tongue 130 is hinge-mounted, or pivotably attached. Thus a rodent barrier attachment 100 positioned in throat 172.

The embodiment 200 of the rodent barrier attachment not only represents an extremely economical and easily attachable device, but also adapts to fit nearly all thicknesses of conventional toilet bowl ledge members 262, in both front and rear-flushing water closets. Said conventional water closets are characterized by a serpentine discharge channel that enters bowl 260 at a lower bowl opening 261. The thickness of material that lies between the upper roof 273 of the serpentine discharge channel 272, and the upwardly-curving inner-rear surface 279 of the toilet bowl forms a ledge or shelf-like member 262 at the top-center of the lower bowl opening 261. To this ledge member 262 the embodiment 200 is removably clamped, as shown in FIG. 12, by a clamp device comprising a gripping plate 224 that lies relatively flat against the discharge channel upper roof 273; a clamping plate 226 that opposes the gripping plate and contacts the bowl-side surface 279 of the ledge members 262; a bridge or spacing device 225 that separates and thus connects the opposed plates 224–226 at their base terminal ends, and to which bridge or spacing device at least one of the opposed plates is pivotally or movably attached; and at least one threaded screw-mechanism 227–228 that can be tightened to draw the two plates together, or toward each other, thus to clamp with pressure against the ledge member 262, or can be loosened to permit the upper jaws of the plates to be spread apart, and said screw-mechanism being so adapted that the bolt 227 is able to turn freely in its hole in the clamping plate 226, and the fastener 228 is held from turning by its fit to gripping plate 224. To gripping plate 224, at its upper end or terminus 215, a pivotal tongue member 230 is pivotably attached by passing loops 231 around pins 215 and thru slots 217. Since the freely pivoting tongue member 230 readily rises upward with and on any outflow of water or debris during flushing action of the toilet, and immediately drops back into protective or blocking position when flushing action ceases, it forms a simple, durable, gravity-operated barrier with little chance of malfunction.

The preferred rodent barrier attachment 10 comprises a mounting plate 20, with a front surface 21 and a back surface 22, a slender, projecting, ledge-like anchoring platform 15 extending outwardly from the front surface 21 of the mounting plate 20 a short but sufficient distance, a layer of water-acid-alkaline impervious mastic 18 that coats the back surface 22 of the mounting plate 20, and at least one tongue 30 that is pivotably joined, i.e., hinged to the anchoring platform 15 at one end, with the opposite end or tip 33 free so as to allow the tongue 30 to swing upwardly and downwardly through an arc of which the hinge-point is the center.

Since rodent barrier attachment 10 is affixed in position in the throat 72 of the discharge channel 70 by pressing the mastic 18 covered back side 22 of the mounting plate 20 against the ceiling 73 of the discharge channel throat 72, and allowing it to become permanently affixed thereto it is necessary that the mounting plate 20 be curved slightly from side 19A to side 19B, or be curvable and conformable side to side, so as to allow the mounting plate 20 to conform to the generally and gently curving cross-sectional shape of the discharge channel throat 72 ceiling 73.

Figure 5:
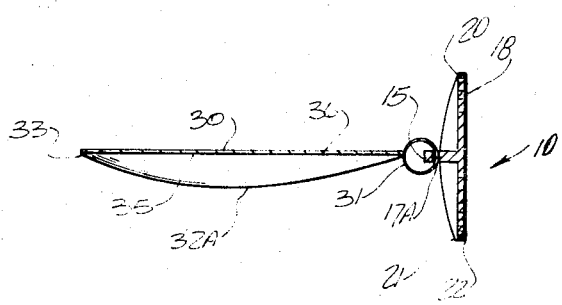
FIG. 5 is a side sectional view of the rodent barrier attachment taken along line 2—2 of FIG. 3.
Figure 4:
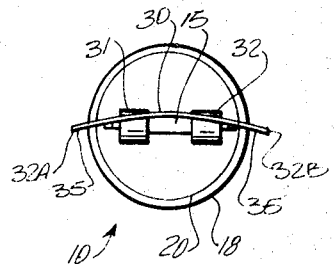
FIG. 4 is a front elevational view, i.e., a view taken from the tip of the tongue of the rodent barrier attachment.
Figure 1:
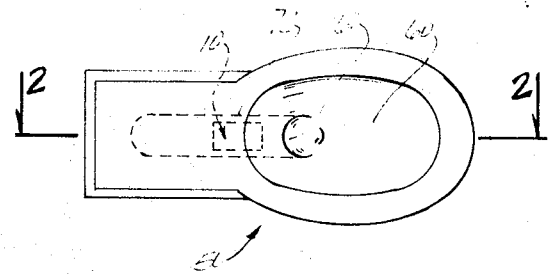
FIG. 1 is a top plan view of a conventional type of water closet having a substantially vertical lower opening. The rodent barrier attachment for the water closet is shown, by dotted lines, within the initial portion of the discharge channel adjacent to the lower exit opening leading from the toilet bowl.

In order to reduce obstruction of the outwardly flow of toilet wastes through throat 72 to a bare minimum, not only is a low or reduced profile of outwardly-projecting platform 15 required, but it is desirable that the pivotable attached tongue or tongues 30 be moderately curved downwardly at the outer sides 35 so that said tongues or tongue conform to the cross-sectionally arched roof 73 as shown in FIGS. 4, 5 and 6. Such curving allows the tongue 30, as the preferred form, to swing upwardly much further, into a nesting position, than would be permitted by a flat tongue which would strike the arched-roof 73 of throat 72 far sooner, and cause a proportionally reduced outwardly flow of debris. Thus, it is desirable that tongue 30 be slightly curved downwardly at its two sides 32A and 32B forming an upwardly facing convex crown that runs from hinged end to tip 33; this curve to conform to the average cross-sectional arch of roof 73 of throat 72 found in conventional water closets 50.

Proper function of a rodent barrier device also requires that the specific design of all conventional water closets, be served effectively, this to include the rear flushing variety which has an opening or nozzle positioned in the center of the arch of roof 73, slightly inside of the lower bowl exit 61, which projects a stream of water up the discharge channel, and thus facilitates flushing action. If a solid single tongue member, or a centered tongue of a multitude were employed, this flushing action would be deflected, or the tongue would be forced downwardly by the stream of water, restricting outwardly flow of toilet debris or flushing action or both. Thus, when a multitude of tongues is employed, none shall be centered; and the middle pair, spaced evenly from the center, shall have a space between them no less than ¼" or greater than ⅝". In the case of the preferred, single-tongue 30, an area 36 of that tongue 30 shall be removed starting at the hinge end said area being of appropriate width, and extending forwardly toward the tip end 33 a sufficient distance to clear the downwardly and rearwardly projected stream of flushing water.

Pivotably attached to the forward edge of anchoring platform 15 of mounting plate 20 is at least one tongue member 30 as described above. Conveniently herein one pivotal tongue 30 is employed, this tongue having a free end 33, e.g., remote of the tongue member's pivotal attachment to anchoring platform 15. Since it is desirable that tongue 30 readily swing upwardly at the least pressure of water or wastes moving rearwardly through the discharge channel throat 61, said tongue should be very freely pivotal. The most obviously proper material to be used in forming tongue 30 is thin, stainless-steel sheet or ribbon stock. Use of this material also allows tongue 30 to be simply and freely atached to anchoring platform 15 by bending straplike, rearwardly extending strips of the tongue material through suitably positioned and spaced rectangular perforations 17A and 17B in platform 15, and then back in a full circle to touch their point of emination from tongue 30, as shown by formed strap 31 in FIG. 5.

Since effective functioning of rodent barrier attachment 10 requires that rodent entry through discharge channel 70 into bowl 60 be firmly blocked, tongue 30 must resist such entry. As shown in preferred embodiment 10, FIG. 6, the length of the freely-pivotal tongue 30 must exceed the maximum vertical height of throat 72, between roof 73 and floor 74, in any water closet in which it may be used. When the tongue length exceeds this distance, the lower tip 33 of pivotal tongue 30 rests upon the throat floor 74 at an angularly inclined plane from mounting and anchoring plate 20. Thus, when a rodent encounters forwardly extending, slightly inclined and submerged tongue 30 resting upon throat floor 74, the floor blocks tongue 30 from pivoting rearwardly.

Regarding tongue length, tongue 30 should exceed the maximum vertical height of throat 72, between roof 73 and floor 74, in any water closet in which it is used, and may be as long from hinge-point contact at 31–17A (FIG. 5) to tip 33 as would be required to reach from this hinge point to a point of tip 33 contact with floor 74 just beneath the surface of sump contained water 80, i.e., the highest point to which the discharge channel floor 74 rises before the discharge channel abruptly decends to its connection with the floor-level sewer-pipe entry at 75. As has been touched upon in prior discussion, it is felt that it is most desirable that the entire rodent barrier attachment, whether embodiment 10 or 100 be so designed and positioned as to be entirely or predominantly submerged under the surface 80, of the sump water at all normal times. This, first, allows for maximum cleanliness of the unit. Even as important, it requires that an entering rodent encounter tongue 30 at the moment a place where the rodent is at the greatest disadvantage. Additionally, even though a dangling form of tongue 30 will be subsequently discussed, it is far more desirable that the sewer rodent be blocked and stopped by a submerged tongue lying in the lightly inclined plane, i.e., blocked further up the discharge channel throat 72, than to try to block him at the point of bowl entrance 61 into discharge channel throat 72. The deeper into throat 72 the rodent proceeds, the less his chances of reversing his direction without becoming wedged in the channel, thus to drown. The resulting channel blockage could be a source of unpleasant labor or cost to the water closet owner.

In the event that a tongue 30 is employed that is shorter in length than the maximum height of throat 72 from roof 73 to floor 74 (FIG. 10), then a tab of some width that is an integral part of tongue 30 at its hinge point end, and centered there, shall extend from that end a short but sufficient distance, and at right angles to the plane of tongue 30 in the direction of the lower bowl opening 61, so that any pressure against tongue 30, from the discharge channel side, shall cause the tab so described to press upwardly against the unyielding mounting plate 20 or the roof of throat 72, thus restricting movement of the tongue 30 toward bowl 60.

Having now described in detail the essential technological features of the attachable rodent barrier device in the form of preferred emboliment 10, the closely related and fully concealed embodiment 100 will now be described.

Embodiment 100, shown in FIGS. 7, 8 and 9 differs from embodiment 10 in these principal respects. Though embodiment 100, too, is more or less permanently affixed in throat 172, completely out of sight of a person looking downwardly into the toilet bowl, and though the pivotably attached tongue is fully identical to those designs, specifications and operational functions previously discussed for embodiment 10, yet embodiment 100 does differ in its method of attachment within and relationship to throat 172 in that it requires a modification of roof 173 and upper side walls of throat 172 to allow a spring loaded, compressible-expandable pinion 101, to which tongue 130 is pivotably attached and centered by guides 102 and 103, to be lodged in that modified area close to throat roof 173. Since the upper throat modification has been detailed previously, only attaching method will be discussed. To position and secure embodiment 100, pinion 101 is compressed by squeezing ends 106 and 107 toward one another, thus compressing spring 108, and reducing the length of pinion 101. When positioned properly in upper throat 172 at insets 175A and 175B, pinion 101 is allowed to expand, its rodlike ends 106 and 107 inserting into stopped holes 176A and 176B which pierce vertical walls 177A and 177B residing in the upper reaches of the opposite walls of throat 172 in insets 175A and 175B. Thus, embodiment 100 is most obviously employable as an O.E.M. item, or water-closet manufacturer installed model, since the manufacturer of the water closet must include in his product the modification in discharge channel throat 172 that has been described, and is required for successful use of this embodiment 100.

From the foregoing, the construction and operation of the rodent barrier device will be readily understood, and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A rodent barrier attachment device adapted to be inserted into and affixed securely below the normal water level within the discharge channel of a water closet of the type having a bowl with a lower opening discharging into the inlet end of a discharge channel, said device comprising:

a mounting plate having a front surface, a rear surface, and an anchoring platform integrally secured to said plate at said front surface;

an adhesive applied to said rear surface for securing said plate to the ceiling of the discharge channel with said plate one end disposed away from the lower opening and said plate other end disposed near the lower opening; and a pivotal tongue member pivotally attached at one end thereof to said platform and adapted to swing from a normal position disposed across the discharge channel to a flushing position by the action of water or debris flowing through the discharge channel from the inlet end thereof, said tongue member when in said normal position adapted to prevent a rodent from passing through the discharge channel to the inlet end;

said plate and said member disposed completely within the discharge channel.

2. A rodent barrier attachment device as defined in claim 1 wherein said plate is curved from side to side to conform to the shape of the discharge channel ceiling.

3. A rodent barrier attachment device as defined in claim 1 wherein said member is longer than the height of the discharge channel for the purpose of preventing said member from pivoting through an arc greater than 90°.

4. A recent barrier attachment device as defined in claim 3 wherein said member is curved from side to side to conform to the shape of the discharge channel ceiling thus presenting minimum obstruction to the flow of material through the discharge channel when in said first position, and has a curved outer end conforming to the curvature of the discharge channel floor.

5. A rodent barrier attachment device as defined in claim 4 wherein said one member has an opening formed therethrough.

6. A rodent barrier attachment device as defined in claim 3 and including a second pivotal tongue member pivotally attached to said platform, said second member disposed in spaced apart, side by side relationship to said first member and having a length greater than the height of the discharge channel for the purpose of preventing said second member from pivoting through an arc of greater than 90°.

7. A rodent barrier attachment device as defined in claim 2 and including stop means operably disposed between said platform and said member for preventing said member from swinging through an arc of greater than 90°.

8. A rodent barrier attachment device as defined in claim 7 wherein said member is curved from side to side to conform to the shape of the discharge channel ceiling, thus presenting minimum obstruction to the flow of material through the discharge channel when in said first position, and has a curved outer end conforming to the curvature of the discharge channel floor.

9. A rodent barrier attachment device as defined in claim 8 wherein said one member has an opening formed therethrough.

10. A rodent barrier attachment device as defined in claim 9 and including a second pivotal tongue member pivotally attached to said platform, said second member disposed in spaced apart, side by side relationship to said first member, and having a second stop means disposed between said platform and said second member for preventing said second member from swinging through an arc of greater than 90°.

11. A tongue member for an underwater rodent barrier device having a retaining element secured at the ceiling of a discharge channel of a water closet of the type having a bowl with a lower opening discharging into the discharge channel, said member comprising;

a tongue pivotally attached at one end thereof to said retaining element and adapted to swing from a normal position disposed across the discharge channel to a flushing position by the action of water or debris flowing through the discharge channel from the inlet end thereof, said tongue member when in said normal position adapted to prevent a rodent from passing through the discharge channel to the inlet end, the tongue being curved from side to side to conform to the shape of the ceiling and having the other end thereof curved, thus conforming to the shape of the discharge channel floor when said tongue is in said flushing position.

12. A rodent barrier attachment device adapted to be inserted into and affixed securely within the discharge channel of a water closet of the type having a bowl with a lower opening adapted to discharge into a discharge channel, said device comprising;

a serpentine discharge channel having a ceiling wall, a pair of oppositely disposed side walls depending from said ceiling wall and a bottom wall interconnecting the depending ends of said side walls, each side wall having a blind hole formed therein substantially adjacent said ceiling wall, said blind holes disposed opposite each other in horizontal alignment;

a pinion device mounted in and extending between said blind holes;

at least one pivotal tongue member pivotally attached at one end thereof to said pinion device and adapted to swing from a normal position disposed across the discharge channel to a flushing position by the action of water or debris flowing through the discharge channel from the inlet end thereof, said tongue member when in said normal position adapted to prevent a rodent from passing through the discharge channel to the inlet end.

13. A rodent barrier attachment device as defined in claim 12 wherein said at least one member is longer than the height of said discharge channel for the purpose of preventing said at least one member from pivoting through an arc of greater than 90°.

14. A rodent barrier attachment device as defined in claim 13 wherein said at least one member is curved from side to side to conform to the shape of said ceiling wall, thus presenting minimum obstruction to the flow of material through said discharge channel when in said first position.

15. A rodent barrier attachment device as defined in claim 12 and including stop means operably disposed between said pinion device and said at least one member for preventing said member from swinging through an arc of greater than 90°.

16. A rodent barrier attachment device as defined in claim 15 wherein said at least one member other end is curved to conform to the shape of said discharge channel floor.

References Cited

UNITED STATES PATENTS

| | | | |
|---|---|---|---|
| 344,141 | 6/1886 | Shoults | 43—65X |
| 814,788 | 3/1906 | Lenhart | 137—527.8X |
| 2,089,141 | 8/1937 | Wasserman | 137—247.19 |
| 2,616,210 | 11/1952 | Reeb | 43—61 |
| 2,683,951 | 7/1954 | Hamaker | 43—61 |
| 3,047,013 | 7/1962 | Baumbach | 137—525.1 |
| 3,393,408 | 7/1968 | Martin | 4—1 |

LAVERNE D. GEIGER, Primary Examiner

H. K. ARTIS, Assistant Examiner

U.S. Cl. X.R.

43—61, 65